(12) United States Patent
Kulkarni et al.

(10) Patent No.: US 10,363,910 B2
(45) Date of Patent: Jul. 30, 2019

(54) AUTOMATED GAIN AND BOOST FOR A BRAKE CONTROLLER

(71) Applicant: HORIZON GLOBAL AMERICAS INC., Plymouth, MI (US)

(72) Inventors: Chandrakumar D. Kulkarni, Battle Creek, MI (US); Muthukumar Jegadeeson, Novi, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 15/834,712

(22) Filed: Dec. 7, 2017

(65) Prior Publication Data

US 2018/0154874 A1  Jun. 7, 2018

Related U.S. Application Data

(60) Provisional application No. 62/431,065, filed on Dec. 7, 2016.

(51) Int. Cl.
| | | |
|---|---|---|
| *B60T 8/17* | (2006.01) | |
| *B60T 8/32* | (2006.01) | |
| *B60T 8/172* | (2006.01) | |
| *B60T 7/20* | (2006.01) | |
| *B60T 17/18* | (2006.01) | |
| *B60T 8/00* | (2006.01) | |

(Continued)

(52) U.S. Cl.
CPC .............. *B60T 8/1708* (2013.01); *B60T 7/20* (2013.01); *B60T 8/00* (2013.01); *B60T 8/17* (2013.01); *B60T 8/172* (2013.01); *B60T 8/323* (2013.01); *B60T 8/3205* (2013.01); *B60T 8/3255* (2013.01); *B60T 13/08* (2013.01); *B60T 17/18* (2013.01); *B60T 2220/04* (2013.01)

(58) Field of Classification Search
CPC .......... B60T 7/20; B60T 17/18; B60T 8/1708; B60T 8/3205; B60T 8/172
USPC ........................................................... 701/70
See application file for complete search history.

(56) References Cited

U.S. PATENT DOCUMENTS

| | | |
|---|---|---|
| 1,132,294 A | 3/1915 | Wilkie |
| 2,228,631 A | 1/1941 | Kuiper |
| 2,870,276 A | 1/1959 | Gelzer |

(Continued)

FOREIGN PATENT DOCUMENTS

| | | |
|---|---|---|
| CA | 2157820 | 3/1996 |
| CA | 2201986 | 10/1997 |

(Continued)

OTHER PUBLICATIONS

International Searching Authority, European Patent Office, International Search Report and Written Opinion, PCT/US2017/065085, dated Apr. 4, 2018.

(Continued)

*Primary Examiner* — Tan Q Nguyen
(74) *Attorney, Agent, or Firm* — McDonald Hopkins LLC

(57) ABSTRACT

The present disclosure includes a system, method, and device related to controlling brakes of a towed vehicle. A brake controller system includes a brake controller that controls the brakes of a towed vehicle based on acceleration. The brake controller is in communication with a speed sensor. The speed sensor determines the speed of a towing vehicle or a towed vehicle. The brake controller automatically sets a gain or boost based on the speed and acceleration.

20 Claims, 6 Drawing Sheets

(51) Int. Cl.
*B60T 13/08* (2006.01)
*G06F 19/00* (2018.01)

(56) References Cited

U.S. PATENT DOCUMENTS

| | | |
|---|---|---|
| 3,015,958 A | 1/1962 | Dove |
| 3,023,626 A | 3/1962 | Bonnell |
| 3,053,348 A | 9/1962 | Stair |
| D199,904 S | 12/1964 | Nunn, Jr. |
| 3,183,512 A | 5/1965 | Castle |
| 3,276,270 A | 10/1966 | Speen |
| 3,354,725 A | 11/1967 | Canfield |
| D215,158 S | 9/1969 | Ozaki |
| 3,497,266 A | 2/1970 | Umpleby |
| 3,501,599 A | 3/1970 | Horecky |
| 3,503,652 A | 3/1970 | Broek |
| 3,519,805 A | 7/1970 | Throne-Booth |
| 3,569,788 A | 3/1971 | Niblack |
| 3,574,414 A | 4/1971 | Jacob |
| 3,598,453 A | 8/1971 | Riordan |
| 3,601,794 A | 8/1971 | Blomenkamp et al. |
| 3,704,670 A | 12/1972 | Dobson et al. |
| 3,710,629 A | 1/1973 | Wojtulewicz |
| 3,730,287 A | 5/1973 | Fletcher et al. |
| 3,738,710 A | 6/1973 | Pokrinchak et al. |
| 3,778,118 A | 12/1973 | Podlewski et al. |
| 3,780,832 A | 12/1973 | Marshall |
| 3,792,250 A | 2/1974 | Kilbourn et al. |
| 3,833,784 A | 9/1974 | Bobel et al. |
| 3,867,844 A | 2/1975 | Shimizu et al. |
| 3,897,979 A | 8/1975 | Vangalis et al. |
| 3,908,782 A | 9/1975 | Lang et al. |
| 3,909,075 A | 9/1975 | Pittet, Jr. et al. |
| 3,953,080 A | 4/1976 | Bremer |
| 3,953,084 A | 4/1976 | Pittet, Jr. et al. |
| 3,955,652 A | 5/1976 | Nilsson et al. |
| 3,964,796 A | 6/1976 | Bremer |
| 3,967,863 A | 7/1976 | Tomecek et al. |
| 3,981,542 A | 9/1976 | Abrams et al. |
| 3,981,544 A | 9/1976 | Tomecek et al. |
| 3,993,362 A | 11/1976 | Kamins et al. |
| 4,030,756 A | 6/1977 | Eden |
| 4,042,810 A | 8/1977 | Mosher |
| 4,043,608 A | 8/1977 | Bourg et al. |
| 4,050,550 A | 9/1977 | Grossner et al. |
| 4,061,407 A | 12/1977 | Snow |
| 4,072,381 A | 2/1978 | Burkhart et al. |
| 4,076,327 A | 2/1978 | Hubbard |
| 4,079,804 A | 3/1978 | Paillard |
| 4,084,859 A | 4/1978 | Bull et al. |
| 4,108,006 A | 8/1978 | Walter |
| 4,122,434 A | 10/1978 | Jensen |
| 4,128,745 A | 12/1978 | Marsilio et al. |
| 4,161,649 A | 7/1979 | Klos et al. |
| 4,196,936 A | 4/1980 | Snyder |
| D257,972 S | 1/1981 | Freehauf et al. |
| D257,973 S | 1/1981 | Reid |
| 4,277,895 A | 7/1981 | Wiklund |
| 4,295,687 A | 10/1981 | Becker et al. |
| 4,316,067 A | 2/1982 | Whiteman, Jr. |
| 4,336,592 A | 6/1982 | Beck |
| D266,501 S | 10/1982 | Stefanik |
| 4,370,714 A | 1/1983 | Rettich |
| 4,386,427 A | 5/1983 | Hosaka |
| 4,398,252 A | 8/1983 | Frait |
| 4,402,047 A | 8/1983 | Newton et al. |
| 4,404,619 A | 9/1983 | Ferguson |
| 4,414,848 A | 11/1983 | Shutt |
| 4,419,654 A | 12/1983 | Funk |
| 4,445,376 A | 5/1984 | Merhav |
| D275,973 S | 10/1984 | Marino |
| 4,550,372 A | 10/1985 | Kahrs |
| 4,586,138 A | 4/1986 | Mullenhoff et al. |
| 4,587,655 A | 5/1986 | Hirao et al. |
| 4,624,506 A | 11/1986 | Doto |
| 4,660,418 A | 4/1987 | Greenwood et al. |
| 4,665,490 A | 5/1987 | Masaki et al. |
| 4,681,991 A | 7/1987 | Anderson |
| 4,721,344 A | 1/1988 | Frait et al. |
| 4,722,576 A | 2/1988 | Matsuda |
| 4,726,627 A | 2/1988 | Frait et al. |
| 4,768,840 A | 9/1988 | Sullivan et al. |
| 4,836,616 A | 6/1989 | Roper et al. |
| 4,845,464 A | 7/1989 | Drori et al. |
| 4,849,655 A | 7/1989 | Bennett |
| 4,850,656 A | 7/1989 | Ise et al. |
| 4,852,950 A | 8/1989 | Murakami |
| 4,856,850 A | 8/1989 | Aichele et al. |
| 4,872,099 A | 10/1989 | Kelley et al. |
| 4,905,518 A | 3/1990 | Kubler |
| 4,928,084 A | 5/1990 | Reiser |
| D308,666 S | 6/1990 | Oesterheld et al. |
| D315,216 S | 3/1991 | Kelley et al. |
| 5,002,343 A * | 3/1991 | Brearley ............... B60T 8/1708 188/112 R |
| D316,399 S | 4/1991 | Wharton |
| 5,016,898 A | 5/1991 | Works et al. |
| 5,032,821 A | 7/1991 | Domanico et al. |
| D319,423 S | 8/1991 | Karczewski et al. |
| 5,044,697 A | 9/1991 | Longyear et al. |
| 5,050,937 A | 9/1991 | Eccleston |
| 5,050,938 A | 9/1991 | Brearley et al. |
| 5,050,940 A | 9/1991 | Bedford et al. |
| 5,058,960 A | 10/1991 | Eccleston et al. |
| D322,426 S | 12/1991 | Austin |
| D323,136 S | 1/1992 | Chase et al. |
| 5,080,445 A | 1/1992 | Brearley et al. |
| D326,926 S | 6/1992 | Stephenson et al. |
| 5,139,315 A | 8/1992 | Walenty et al. |
| 5,142,473 A | 8/1992 | Davis |
| 5,149,176 A | 9/1992 | Eccleston |
| D331,226 S | 11/1992 | Austin |
| D334,733 S | 4/1993 | Morgan et al. |
| 5,226,700 A | 7/1993 | Dyer |
| 5,242,215 A | 9/1993 | Krause |
| 5,255,962 A | 10/1993 | Neuhaus et al. |
| 5,322,255 A | 6/1994 | Garrett |
| 5,333,948 A | 8/1994 | Austin et al. |
| D351,141 S | 10/1994 | Van Akkeren et al. |
| 5,352,028 A | 10/1994 | Eccleston |
| 5,355,717 A | 10/1994 | Tanaka et al. |
| 5,389,823 A | 2/1995 | Hopkins et al. |
| D365,298 S | 3/1995 | Austin |
| 5,398,901 A | 3/1995 | Brodmann et al. |
| 5,423,601 A | 6/1995 | Sigl |
| 5,446,657 A | 8/1995 | Ikeda et al. |
| D362,659 S | 9/1995 | Hedding et al. |
| D363,999 S | 11/1995 | Taylor et al. |
| 5,487,305 A | 1/1996 | Ristic et al. |
| 5,487,598 A | 1/1996 | Rivard et al. |
| 5,498,910 A | 3/1996 | Hopkins et al. |
| D369,224 S | 4/1996 | Karlo et al. |
| 5,510,989 A | 4/1996 | Zabler et al. |
| D370,448 S | 6/1996 | McCoy et al. |
| 5,549,362 A | 8/1996 | Broome |
| 5,549,364 A | 8/1996 | Mayr-Frohlich et al. |
| 5,571,023 A | 11/1996 | Anthony |
| 5,575,543 A | 11/1996 | Pheonix |
| D376,437 S | 12/1996 | Karlo et al. |
| D376,576 S | 12/1996 | Pratt |
| 5,581,034 A | 12/1996 | Dao et al. |
| 5,587,865 A | 12/1996 | Bielig et al. |
| 5,606,308 A | 2/1997 | Pinkowski |
| D378,511 S | 3/1997 | Austin |
| 5,615,930 A | 4/1997 | McGrath et al. |
| 5,620,236 A | 4/1997 | McGrath et al. |
| 5,648,755 A | 7/1997 | Yagihashi |
| 5,649,749 A | 7/1997 | Kullmann et al. |
| D388,523 S | 12/1997 | Austin |
| 5,700,068 A | 12/1997 | Austin |
| 5,706,909 A | 1/1998 | Bevins et al. |
| 5,719,333 A | 2/1998 | Hosoi et al. |
| D392,604 S | 3/1998 | Wright et al. |
| 5,738,363 A | 4/1998 | Larkin |

(56) References Cited

U.S. PATENT DOCUMENTS

| | | |
|---|---|---|
| 5,741,048 A | 4/1998 | Eccleston |
| D394,626 S | 5/1998 | Sacco et al. |
| 5,782,542 A | 7/1998 | McGrath et al. |
| 5,785,393 A | 7/1998 | McGrath et al. |
| 5,800,025 A | 9/1998 | McGrath et al. |
| D399,187 S | 10/1998 | Kay |
| 5,832,840 A | 11/1998 | Woof |
| D404,365 S | 1/1999 | Robertson et al. |
| 5,890,084 A | 3/1999 | Halasz et al. |
| D407,694 S | 4/1999 | Hill et al. |
| D408,773 S | 4/1999 | Blanchard |
| 5,893,575 A | 4/1999 | Larkin |
| D411,829 S | 7/1999 | Pancheri et al. |
| 5,949,147 A | 9/1999 | McGrath et al. |
| 5,951,122 A | 9/1999 | Murphy |
| D418,098 S | 12/1999 | Wallace |
| D418,822 S | 1/2000 | Worley et al. |
| 6,012,780 A | 1/2000 | Duvemay |
| 6,039,410 A | 3/2000 | Robertson et al. |
| 6,052,644 A | 4/2000 | Murakami et al. |
| 6,068,352 A | 5/2000 | Kulkarni et al. |
| 6,100,943 A | 8/2000 | Koide et al. |
| 6,122,568 A | 9/2000 | Madau et al. |
| 6,126,246 A | 10/2000 | Decker, Sr. et al. |
| 6,131,457 A | 10/2000 | Sato |
| D433,387 S | 11/2000 | Roth et al. |
| D434,011 S | 11/2000 | Roth et al. |
| D434,391 S | 11/2000 | Roth et al. |
| D434,392 S | 11/2000 | Reichard |
| D435,494 S | 12/2000 | Reichard |
| D436,932 S | 1/2001 | Roth et al. |
| 6,175,108 B1 | 1/2001 | Jones et al. |
| 6,177,865 B1 | 1/2001 | Bryant et al. |
| 6,179,390 B1 | 1/2001 | Guzorek et al. |
| 6,201,284 B1 | 3/2001 | Hirata et al. |
| 6,232,722 B1 | 5/2001 | Bryant et al. |
| 6,234,584 B1 | 5/2001 | Stumpe et al. |
| 6,263,733 B1 | 7/2001 | Reimer et al. |
| 6,273,522 B1 | 8/2001 | Feetenby et al. |
| 6,282,480 B1 | 8/2001 | Morse et al. |
| 6,286,911 B1 | 9/2001 | Wright et al. |
| 6,299,102 B2 | 10/2001 | Happ |
| 6,308,134 B1 | 10/2001 | Croyle et al. |
| D450,661 S | 11/2001 | Weisz et al. |
| D451,611 S | 12/2001 | Pontarolo |
| 6,325,466 B1 | 12/2001 | Robertson et al. |
| 6,364,432 B1 | 4/2002 | Mixon |
| 6,367,588 B1 | 4/2002 | Robertson et al. |
| 6,371,572 B1 | 4/2002 | Frank |
| 6,405,592 B1 | 6/2002 | Murari et al. |
| 6,419,055 B1 | 7/2002 | Walsh et al. |
| 6,445,993 B1 | 9/2002 | Eccleston et al. |
| 6,466,821 B1 | 10/2002 | Pianca et al. |
| 6,499,814 B1 | 12/2002 | Mixon |
| D468,273 S | 1/2003 | Reichard |
| D468,704 S | 1/2003 | Reichard |
| D468,705 S | 1/2003 | Reichard |
| 6,516,925 B1 | 2/2003 | Napier et al. |
| 6,520,528 B2 | 2/2003 | Fandrich et al. |
| 6,532,419 B1 | 3/2003 | Begin et al. |
| 6,557,952 B1 | 5/2003 | Robertson et al. |
| D477,553 S | 7/2003 | Brock et al. |
| 6,609,766 B1 | 8/2003 | Chesnut |
| 6,615,125 B2 | 9/2003 | Eccleston et al. |
| 6,619,759 B2 | 9/2003 | Bradsen et al. |
| 6,626,504 B2 | 9/2003 | Harner et al. |
| 6,634,466 B1 | 10/2003 | Brock et al. |
| 6,652,038 B1 | 11/2003 | Frye |
| 6,652,039 B1 | 11/2003 | Shull |
| 6,655,752 B2 | 12/2003 | Robertson et al. |
| 6,666,527 B2 | 12/2003 | Gill et al. |
| 6,668,225 B2 | 12/2003 | Oh et al. |
| 6,685,281 B2 | 2/2004 | MacGregor et al. |
| D488,370 S | 4/2004 | Sivertsen |
| D490,349 S | 5/2004 | Brock et al. |
| 6,752,474 B1 | 6/2004 | Olberding et al. |
| D494,547 S | 8/2004 | Smith et al. |
| 6,802,572 B2 | 10/2004 | Lamke et al. |
| 6,802,725 B2 | 10/2004 | Rowland et al. |
| D498,190 S | 11/2004 | Brock et al. |
| 6,837,551 B2 | 1/2005 | Robinson et al. |
| 6,845,851 B1 | 1/2005 | Donaldson et al. |
| 6,849,910 B2 | 2/2005 | Oberhardt et al. |
| 6,891,468 B2 | 5/2005 | Koenigsberg et al. |
| 6,918,466 B1 | 7/2005 | Decker, Jr. et al. |
| D509,959 S | 9/2005 | Nykoluk |
| 6,966,613 B2 | 11/2005 | Davis |
| D513,171 S | 12/2005 | Richardson |
| 7,021,723 B1 | 4/2006 | Kaufman |
| D522,041 S | 5/2006 | Sewell |
| D523,803 S | 6/2006 | Smith et al. |
| 7,058,499 B2 | 6/2006 | Kissel |
| D527,710 S | 9/2006 | Smith et al. |
| 7,168,531 B2 | 1/2007 | Navarro |
| 7,204,564 B2 | 4/2007 | Brown et al. |
| D542,745 S | 5/2007 | Barnes, Jr. et al. |
| D551,139 S | 9/2007 | Barnes et al. |
| 7,273,260 B2 | 9/2007 | Gray |
| 7,311,364 B2 | 12/2007 | Robertson |
| 7,347,507 B1 | 3/2008 | Stillinger |
| D581,356 S | 11/2008 | Ahlgren |
| D584,695 S | 1/2009 | Hilsbos et al. |
| D593,507 S | 6/2009 | Svoboda et al. |
| D598,395 S | 8/2009 | Hilsbos et al. |
| 7,575,286 B2 | 8/2009 | Robertson |
| D603,808 S | 11/2009 | Svoboda et al. |
| D619,542 S | 7/2010 | Svoboda et al. |
| 8,145,402 B2 | 3/2012 | Craig |
| 8,165,768 B2 | 4/2012 | Leschuk et al. |
| 8,180,546 B2 | 5/2012 | Culbert et al. |
| 8,430,458 B2 | 4/2013 | Kaminski et al. |
| 8,442,797 B2 | 5/2013 | Kim et al. |
| 8,651,585 B2 | 2/2014 | Kaminski et al. |
| 8,700,285 B2 | 4/2014 | Barlsen et al. |
| 8,746,812 B2 | 6/2014 | Albright et al. |
| 8,789,896 B2 | 7/2014 | Albright et al. |
| 9,738,125 B1 | 8/2017 | Brickley |
| 2001/0038239 A1 | 11/2001 | Ehrlich et al. |
| 2002/0003571 A1 | 1/2002 | Schofield et al. |
| 2002/0038974 A1 | 4/2002 | Lamke et al. |
| 2002/0047684 A1 | 4/2002 | Robertson et al. |
| 2002/0082750 A1 | 6/2002 | Lamke et al. |
| 2002/0095251 A1 | 7/2002 | Oh et al. |
| 2002/0123837 A1* | 9/2002 | Eccleston ............... B60T 7/20 701/70 |
| 2002/0180257 A1 | 12/2002 | Gill et al. |
| 2003/0025597 A1 | 2/2003 | Schofield |
| 2003/0038534 A1 | 2/2003 | Bamett |
| 2003/0042792 A1 | 3/2003 | Reinold et al. |
| 2003/0098610 A1 | 5/2003 | Bradsen et al. |
| 2003/0168908 A1 | 9/2003 | Robinson et al. |
| 2004/0026987 A1 | 2/2004 | Davis |
| 2004/0174141 A1 | 9/2004 | Luz et al. |
| 2004/0245849 A1 | 12/2004 | Kissel |
| 2005/0035652 A1 | 2/2005 | Roll et al. |
| 2005/0077780 A1 | 4/2005 | Robertson |
| 2005/0127747 A1 | 6/2005 | Robertson |
| 2006/0076827 A1 | 4/2006 | Albright et al. |
| 2006/0176166 A1 | 8/2006 | Smith et al. |
| 2006/0214506 A1 | 9/2006 | Albright et al. |
| 2007/0024107 A1 | 2/2007 | Marsden et al. |
| 2007/0114836 A1 | 5/2007 | Kaminski et al. |
| 2007/0222283 A1 | 9/2007 | Skinner et al. |
| 2008/0309156 A1 | 12/2008 | Kissel |
| 2010/0152920 A1 | 6/2010 | McCann |
| 2010/0152989 A1 | 6/2010 | Smith et al. |
| 2010/0222979 A1 | 9/2010 | Culbert et al. |
| 2013/0296107 A1* | 11/2013 | Nedorezov ............ B60W 10/02 477/5 |
| 2014/0103619 A1 | 4/2014 | Motts et al. |
| 2015/0081184 A1 | 3/2015 | Braunberger |

(56) References Cited

U.S. PATENT DOCUMENTS

2015/0353063 A1 12/2015 Tuhro
2018/0229658 A1* 8/2018 Lavoie .................. B60R 1/00

FOREIGN PATENT DOCUMENTS

| | | |
|---|---|---|
| CA | 2324091 | 4/2001 |
| CA | 109867 | 8/2006 |
| EP | 0334412 | 9/1989 |
| WO | WO97/07003 | 2/1997 |

OTHER PUBLICATIONS

Motorola, Motorola Holster—SYN0718, http://commerce.motorola.com/cgi-bin/ncommerce3/ProductDisplay?prrfnbr=230044&prmenbr=126&accessories_cgrfnbr=22 . . . .

Service Manual 440-1002 for Carlisle Electric Brake Actuator Kit, Carlisle Industrial Brake and Friction, pp. 1-8.

Electronic Brake Control for 2, 4, 6 and 8 brake applications manual, 2007, Cequent Electrical Products, 9 pgs.

Hayes Lemmerz—Energize III—Brake Controller, http://aftermarket.hayes-lemmerz.com/html/energize_iii.html.

Hayes Lemmerz—Endeavor—Brake Controller, http://aftermarkethayes-lemmerz.com/html/endeavor.html.

Hayes Lemmerz—Energize XPC—Brake Controller, http://.aftermarkethayes-lemmerz.com/html/energize_xpc.html.

Dexter Axle—Predator DX2 Controller (058-008-00)—Brake Controller, http://www.dexteraxle.com/inc/pdetail?=1&pid=1759.

Tekonsha—AccuPower AccuTrac Inertia Brake Control, 1 to 2 Axle Brake System, Model #80510, http://www.tekonsha.com/accuarac.html.

Tekonsha—AccuPower AccuPower DigiTrac II Inertia Brake Control, 1 to 4 Axle Brake Systems, Model #80750, http://www.tekonsha.com/digitrac.html.

Tekonsha—Voyager, Proporational Brake Control, 1 to 4 Axle Brake Systems, Model #9030, http://www.tekonsha.com/tevoyagerintro.html.

Sample of Applicant's products, http://www.hiddenhitch.com/Products/DisplayAccessory.asp?AccessoryID=39503; and 39510.

Sample of Applicant's products, http://www.hiddenhitch.com/Products/DisplayAccessory.asp?AccessoryID=39517; and 39514.

* cited by examiner

AUTOMATED GAIN AND BOOST FOR A BRAKE CONTROLLER

CROSS-REFERENCE TO RELATED APPLICATION

This application claims priority to U.S. Provisional Patent Application No. 62/431,065 entitled "AUTOMATED GAIN AND BOOST FOR A BRAKE CONTROLLER," filed on Dec. 7, 2016, which is incorporated herein by reference in its entirety.

TECHNICAL FIELD

This disclosure relates to a brake controller device, system and method for controlling brakes of a trailer with a brake controller device. More specifically, a brake controller device with automated gain and boost adjustments is described herein.

BACKGROUND

A variety of brake controllers may be employed to control the brakes of a towed vehicle. Typically, the brake controller may actuate the towed vehicle's brakes in response to braking by the towing vehicle. These brake controllers may often include accelerometers and microprocessors which may measure and/or take into account a variety of conditions (e.g., braking signal, acceleration, etc.), whereby the brake controller may apply the towed vehicle's brakes in such a manner that assists in stopping the towing vehicle and towed vehicle, and may also reduce the likelihood of an unsafe driving condition.

The brake controller is often mounted to the towing vehicle. Typically, the brake controller may be hard-wired to the towing vehicle, such as being mounted in the cab or passenger compartment of the towing vehicle. The brake controller may communicate with the brake system of the towed vehicle by means of a wiring system that may provide communication between the towing vehicle's brake system and the towed vehicle's brake system.

In some instances, the brake controller may be programmed by a user to take into account variables, such as vehicle weight, road conditions, and other parameters that may potentially affect braking effectiveness. These brake controllers may also have gain and boost settings. The gain and boost may be manually set by a user interacting with the brake controller. These manual processes of setting the gain and boost may be inefficient and time consuming. Further, some users may incorrectly set gain and boost settings. Likewise, users may not adjust gain and boost settings when appropriate.

Therefore, there is a need in the art for a more efficient brake controller. The brake controller may automatically set a gain. There is also a need for a brake controller that may automatically set a boost.

SUMMARY

The present disclosure includes a system, method, and devices related to data collection and communication of the performance of various vehicle accessories and systems. These accessories and systems are described in detail below, and any combination of elements and/or methods are contemplated as aspects and embodiments of the overall invention.

A brake controller system is described herein. The brake controller system includes a brake controller device that controls brakes of a towed vehicle. The brake controller device is in communication with a sensor device. The sensor device determines operating parameters of the brake controller system. In addition, the brake controller device automatically determines a gain, a transfer function, or a boost setting.

A method for automatically determining a gain, a transfer function, or a boost setting is described herein. The method includes determining an acceleration of a towed vehicle or towing vehicle. The method determines the speed of the towed vehicle or towing vehicle. And the method includes determining a gain, a transfer function, or a boost setting based on the acceleration and the speed of the towed vehicle or towing vehicle.

The foregoing embodiments are merely exemplary of some of the aspects of the system. Additional features and elements may be contemplated and described herein. Also, features from one of the foregoing embodiments may be combined with features from any of the other foregoing embodiments.

DETAILED DESCRIPTION

Figure 1:
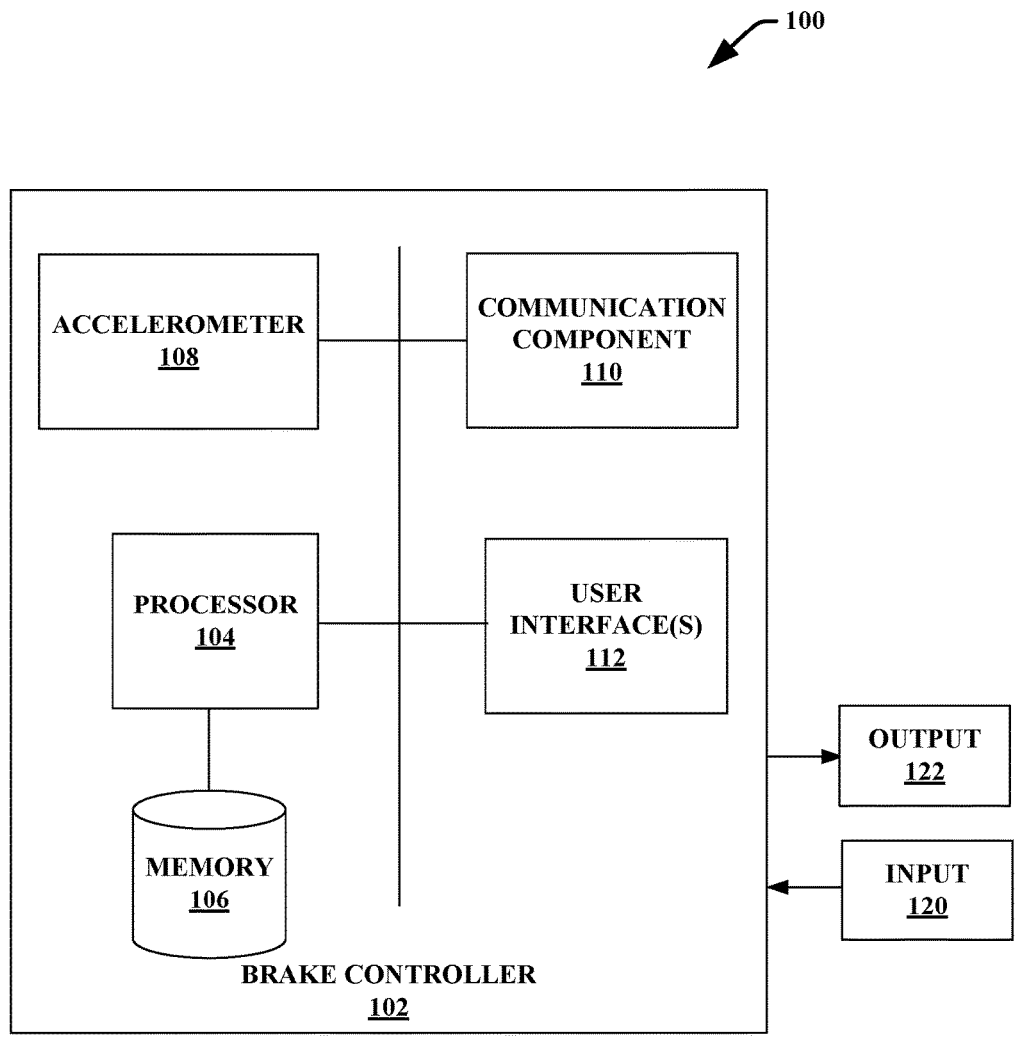
FIG. 1 is a functional schematic diagram of a brake controller system of the present disclosure.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a"

and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). As such, embodiments may describe a user action that may not require human action.

"User equipment," "device," "user equipment device," "client," and the like are utilized interchangeably in the subject application, unless context warrants particular distinction(s) among the terms. By way of example, user equipment may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), global positioning system (GPS) devices, and the like.

As used herein, a towing vehicle may include various types of automobiles (e.g., car, truck, recreational vehicle ("RV"), etc.). A towed vehicle may include trailers (e.g., agricultural trails, boat trailers, etc.), an automobile, or the like. It is noted that various combinations of towed vehicles and towing vehicles may utilize some or all aspects of this disclosure.

Disclosed embodiments may refer to a brake controller, brake controller device, or the like. Such terms are used interchangeably to describe electronic devices that control the brakes of a trailer or towed vehicle. For instance, a brake controller may comprise a unit that is mounted in or on a towing vehicle. The towing vehicle is attached to a towed vehicle (e.g., via a hitch or the like). The towing vehicle may pull, push, or otherwise tow the towed vehicle. The brake controller system may monitor acceleration and application of a brake pedal to control the brakes of the towed vehicle to operatively apply (e.g., engage, release, etc.) the towed vehicle brakes. Moreover, while embodiments may refer to a brake controller system comprising various components, such components may be a single device or multiple devices in communication with each other. For example, a brake controller may include a display, a processing unit, and an accelerometer. These components may be comprised within a single housing or in multiple housings. The components may include wiring, circuitry, or the like. In at least one embodiment, a brake controller may be mounted in or on a towing or towed vehicle. Other components may include anti-sway devices, converters, trailer breakaway systems, tire pressure monitoring systems for trailers, vehicle speed monitoring systems, user equipment devices, internet or network connected devices, external cameras, and the like.

Disclosed embodiments may include user interfaces. As used herein, a user interface may include devices that receive input from a user and transmits the input to electronic circuitry, such as a microprocessor, or outputs information from electronic circuitry to a user. Such user interfaces may include buttons, switches, knobs, touch screens (e.g., capacitive touch screens), microphones, image capturing devices, motion sensors, pressure sensors, a display screen, a speaker, a light (e.g., LED, bulb, etc.), or the like. For brevity, examples may be described with reference to a user interface in general rather than any particular type of user interface. It is noted that brake controllers may include multiple user interfaces of various types.

Networks or communication networks may include wired or wireless data connections to a network (e.g., Ethernet, Wi-Fi, cellular network, local area connections, etc.). Embodiments, for example, may utilize various radio access network (RAN), e.g., Wi-Fi, Wi-Fi direct, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, $x^{th}$ generation long term evolution, or another IEEE 802.XX technology. BLUETOOTH (in any of its various iterations), various wireless technologies for exchanging data over short distances (e.g., ZigBee, RuBee, DASH7, etc.), and other protocols and personal area networks may be utilized. Wireless communication may also include, in whole or in part, communications transmitted over more traditional local area networks (including such networks provided by the vehicle and/or trailer/towed product) or cellular data networks, so as to incorporate aspects of cloud-based computing systems, information available via world wide web and other internet connectivity, and the like. As such, any indication of "wireless," "Wi-Fi," or other similar terminology should be read expansively (at least within the context it is used) throughout this disclosure. Moreover, embodiments may use one or more different communications protocols or devices (whether wired or wireless) to communicate between the various components of the system.

In some traditional brake controllers, users may manually set the gain of the brake controller. Users, such as installers, often set the gain after initially mounting or installing a brake controller. The gain adjusts (e.g., increases, decreases, etc.) the power applied to the trailer's brakes during a braking event by the brake controller. A manual process of adjusting the gain may include the following steps performed by one or more users:

1. Connecting the towed vehicle to a towing vehicle.
2. With engine running, set the gain to a known level via a user interface (e.g., half power, three-quarters power, etc.).
3. Driving the towing vehicle and towed vehicle on a dry level paved surface at a given speed (e.g., 25 mph) and then press a user interface that manually overrides braking of the brake controller to cause the brake controller to apply trailer brakes at a maximum level of braking or pressing the brake pedal. If a user observed the trailer brakes locking up, the user would decrease the gain until the brakes were no longer locked. If braking did not initially lock up the trailer brakes, the user would increase the gain until the brakes locked, then decrease the gain until they did not lock. The user would then use this gain setting (e.g., the setting just below brake locking). The user may repeat this process to adjust the gain. However, in practice the user may not adjust the gain after an initial setup even if the towing parameters change that would necessitate making adjustments again. Further, the user may "eye-ball" or randomly select a gain. This may result in inefficient gain.

Furthermore, users manually set boost settings in some traditional brake controllers. The "boost" setting may adjust the sensitivity of an accelerometer. A boost may set an initial output from a brake controller to the trailer brakes. For example, a brake controller may include a number of boost settings of levels (e.g., which may be set with a user interface). For simplicity, an exemplary brake controller may include three boost levels called B1, B2, and B3. With the boost off, during a braking event, the power to the brakes starts out at zero and increases during a braking event. With the boost on level 1, B1, during a braking event, the power automatically starts out at a first level (e.g., 13%) of the power setting and increases with deceleration. With the boost on level 2, B2, or with the boost on level 3, B3, during a braking event, the power automatically starts out at a second level (e.g., 25%) or third level (e.g., 30%), respectively. A user would manually select the boost based on conditions, such as whether the weight or load of the towed vehicle (e.g., whether a trailer is empty, carrying objects, etc.), a user's preference, brake performance, or the like. To adjust the boost setting, the user may interact with the brake controller via a user interface. Similar to the gain, in practice the user may not adjust the boost after an initial setup even if the towing parameters change that would necessitate making adjustments again. Further, the user may "eye-ball" or randomly select a boost. This may result in inefficient boost.

Braking intent is an unknown factor in traditional aftermarket brake controllers. Thus, brake controllers may use a transfer function for gain or boost adjustments. This transfer function may be determined by a ratio of deceleration (e.g., which may be sensed or determined by an accelerometer) and characteristics of the output signal sent to trailer brakes (e.g., change in power applied to brakes, change in current/voltage applied to brakes, etc.). The transfer function may then be utilized to determine values of the signal sent to the trailer brakes by a brake controller. However, this transfer function does not consider braking intent. For instance, brakes are more efficient when a towed vehicle or towing vehicle is traveling at low speeds. Without knowing the speed, brake controls may apply too much or too little power to the brakes. As a result, the brakes of the towed vehicle may lock up at low speeds. Systems and methods to measure the speed and adjust the output according to the speed are described herein.

Embodiments described herein may determine a transfer function based on braking intent and the signal sent to the trailer brakes by a brake controller. Braking intent may be determined or inferred based on one or more operating parameters or conditions. Operating parameters may include conditions associated with the towed vehicle, towing vehicle, and/or environment. In at least one example, the operating conditions may include conditions of the towing vehicle brake system, towed/towing vehicle speed, the towing vehicle weight, the towed vehicle weight, the towed vehicle brake condition, road conditions (e.g., gravel, paved, weight, dry, etc.), weather conditions (e.g., precipitation, temperature, wind, etc.), or the like. In an aspect, embodiments may provide for a brake controller system that may automatically (e.g., without user interaction) adjust the boost or gain settings of a brake controller. For instance, a brake controller may determine a gain or boost level to utilize based on one or more operating parameters or conditions. In some embodiments, the brake controller may utilize historical operating parameters or conditions. For example, the brake controller may store information when a user stops the vehicle's motion or turns the car off. The brake controller may recall this information when the user starts the car up again or begins to travel. It is noted that described brake controllers may automatically adjust the gain and not the boost, boost and not the gain, or both the gain and the boost.

In an embodiment a system may comprise at least one sensor operatively determining a parameter associated with a braking event; and a brake controller comprising an accelerometer and a processor, the processor in operative communication with the at least one sensor and configured to receive data from the at least one sensor, and wherein the processor determines at least one of a gain level or a boost level based on the data received from the at least one sensor. The at least one sensor may be operatively disposed proximal to at least one of an axle or a wheel of a vehicle or a trailer and operatively measures a change in the vehicle speed or the trailer speed. The at least one sensor may comprises a speed sensor. The speed sensor may be an accelerometer. The speed sensor may be operatively coupled to a lug nut of the vehicle or the trailer. The processor may initiate a calibration process to determine at least one of the gain level or the boost level based on an occurrence of a triggering event. The triggering event may comprise at least one of a passage of time, button press, weather condition, sensed speed, or rake peddle depression. The processor may determine the weather condition based on at least one of activation or deactivation of windshield wipers, or input from a user device. The at least one sensor may comprise a sensor disposed generally proximal to a brake peddle of a vehicle to measure forces applied to the brake peddle. The processor may operatively override the determined gain level or boost level in response to receiving a user request to override the determined gain level or boost level.

In another aspect a brake controller may comprise a hardware processor and a memory storing computer executable instructions; a wireless communication device coupled to the hardware processor and in operative communication with a speed sensor; wherein the processor conducts a calibration process to automatically determine at least one of a gain setting, boost setting, or transfer function as a function of information received from the speed sensor. The hardware processor determines whether a brake peddle of a towed vehicle is not depressed and initiates the calibration process when the brake peddle is not depressed. In another aspect, the hardware processor determines whether the brake peddle of a towed vehicle is not depressed and initiates the calibration process in response to determining that the brake peddle is depressed. The hardware processor ramps an output from the hardware processor to brakes of a trailer in response to initiating the calibration process. The hardware processor monitors for a wheel lock-up based on an input received from the speed sensor as the output is ramped. The hardware processor terminates the ramping in response to detecting the wheel lock-up, reduces the output until the wheel lock-up terminates, and sets a gain value based on a value of the output at the time when the wheel lock-up terminates.

A method for automatically determining a gain setting for a brake controller is described. The method comprises monitoring, by the brake controller, for a triggering event and initiating a calibration of the gain setting in response to the triggering event; ramping output of the brake controller to brakes of a trailer; receiving input from a sensor operatively attached to at least one of a wheel or an axle of the trailer; determining whether the wheels of the trailer are locked based on the input received from the sensor; terminating, in response to determining that the wheels of the trailer are locked, the ramping of the output of the brake controller to the brakes of the trailer; reducing the output of the brake controller to the brakes of the trailer to a value until the wheels are no longer locked; and determining the gain setting based on the value. The method may further comprise determining whether a speed of the trailer is within a predetermined range of speeds; allowing initiation of the calibration process when the speed is determined to be within the predetermined range; and at least one of disabling or notifying a user that the speed is determined to be not within the predetermined range. In another aspect, the method may comprise determining the gain setting is further based on at least one of a weather condition, road grade, or trailer load. Moreover, the method may comprise generating a suggested modification of a setting of a brake controller based a history of calibrations.

Turning now to FIG. 1, there is a functional block diagram of a brake controller system 100 for controlling trailer brakes of a towed vehicle in accordance with various disclosed embodiments. As described herein, the brake controller system 100 may be a proportional or inertia based system for a towing and towed vehicle system.

Brake controller system 100 may primarily include a processor 104, a memory 106, an accelerometer 108, a communication component 110, and user interface(s). It is noted that memory 102 may store computer executable instructions which may be executed by processor 104. In an aspect, instructions may include control instructions that control or instruct the various components described herein. Furthermore, while embodiments may reference user actions, it is noted that users (e.g., humans, etc.) may not be required to perform such actions. Exemplary, non-limiting brake controller units are disclosed in U.S. Pat. Nos. 6,012,780; 6,068,352; 6,282,480; 6,445,993; 6,615,125; 8,746,812; 8,789,896; and 9,150,201.

The accelerometer 108 may comprise an inertia sensor, such as a single or multi-axis accelerometer (e.g., two-axis, three-axis, etc.), gyroscope, or the like. It is noted that various types of accelerometers may be utilized. While described as a single accelerometer, the accelerometer 108 may comprise multiple accelerometers that may be utilized to measure forces. The accelerometer 108 may comprise circuitry or mechanical components that are responsive to changes in forces, such as changes in acceleration. The accelerometer 108 may be communicated to other components of the brake controller 102 such as the processor 104. For example, the brake controller 102 may be mounted in a cab of a towing vehicle. When the towing vehicle changes its speed and/or travels on a different road grade, the accelerometer 108 may generate an output that represents different values. This output may be received by the processor 104. The output may comprise an electric signal that varies based on the magnitude of acceleration.

User interface(s) 112 may comprise input or output devices as described herein. For example, the user interface(s) 112 may include push buttons, display screen, audio input or output devices, and the like. The user interfaces(s) 112 may be coupled to the processor 104 to communicate information to or from a user. For example, the user interface(s) 112 may include a display that is controlled by the processor 104 to generate output 122 in the form of graphical information. In another instance, the user interface(s) 112 may include push buttons that receive input 120 from a user and transmit the input 120 to the processor 104 (e.g., manual brake application, sensitivity adjustments, etc.).

Communication component 110 may comprise one or more communication devices that may receive input 120 and transmit output 122. The communication component 110 may comprise hardware, software, and/or a combination of hardware and software. According to embodiments, the communication component 110 may comprise electrical circuitry that facilitates wired or wireless communication. For example, the communication component 110 may comprise a BLUETOOTH® transmitter/receiver. In another example, the communication component 110 may comprise a wire jack, such as an Ethernet connector, USB port, or the like. It is noted that the communication component 110 may include a device that may be disposed within a housing of the brake controller 102 or may be an external device connected to the brake controller 102.

As described in this disclosure, the processor 104 may automatically determine a gain or boost setting based on braking intent. In at least one embodiment, the processor 104 may determine the speed or rate of travel of at least one of the towing or towed vehicle. Examples may refer to speed of either the towing vehicle or towed vehicle for simplicity of explanation. However, it is noted that described examples may utilize various speeds such as the speed of the towed vehicle, towing vehicle, or both the speed of the towed and towing vehicle. The speed may be measured by the brake controller 102 or may be received by communication component 110 as input 120.

In a first exemplary calibration, the gain and boost may be automatically determined based on comparison of a braking event with a trailer connected and a braking event without a trailer connected. For instance, when the trailer is not connected, braking intent vs. deceleration (x) at a speed will be measured. In an example, a user will drive the vehicle at a given speed or range of speeds (e.g., 35 mph, 25-45 mph, etc.). The user then applies the brake peddle to cause the vehicle to decelerate. The deceleration may be measured by an accelerometer 108. The braking intent may be measured via a sensor operatively sensing aspects of the brake peddle, such as a transducer, accelerometer or other sensor coupled to the brake peddle or a floor board of the vehicle. As such, braking intent may include measuring the rate or force at which a user presses the brake peddle. The 'x' variable may be a function of the braking intent and the deceleration. The 'x' value may be stored in memory 106. For instance, the brake controller system 100 may determine a connectivity state of the brake controller system 100 relative a trailer. If the connectivity state is "not connected" with the brakes of the trailer, the brake controller system 100 may measure the 'x' value. As described herein, the braking intent vs. deceleration may be measured as a function of a change in speed over time and braking power (e.g., voltage, current, etc.) determined by the brake control system 100 for the trailer brakes.

When the trailer is connected, braking intent vs. deceleration (y) at a speed will be measured. In an aspect, the speed may be the same or within a similar range as when determining the 'x' variable. The 'y' value may be stored in memory 106. As described herein, the brake controller system 100 may determine the connectivity state and may measure the 'y' value when the connectivity state is "connected" with brakes of a trailer. It is noted that in some embodiments, a user may manually provide input regarding the connectivity state via user interface(s) 112. In an aspect, the change in speed reduction between the not connected and the connected braking events may generally indicate the weight of the towed vehicle.

The variables 'x' and 'y' may be used to determine gain, transfer curve and boost. It is noted that the 'x' value may be stored and utilized for comparison with different trailers or loads. The processor 104 may review the intent vs. deceleration periodically to assess change in operating parameters and the processor 104 may determine updated gain, transfer curve or boost settings.

As noted, the brake controller system 100 may determine the gain, transfer curve or boost settings based on other operating parameters. Such parameters may be determined from input 120 received from one or more sensors. This input 120 may include, for example, conditions of the towing vehicle brake system, towed/towing vehicle speed, the towing vehicle weight, the towed vehicle weight, the towed vehicle brake condition, road conditions (e.g., gravel, paved, weight, dry, etc.), weather conditions (e.g., precipitation, temperature, wind, etc.), or the like. The processor 104 may receive the operating parameters and may determine the gain, transfer curve or boost settings based on a stored process, a lookup table, or the like.

It is noted that the first exemplary calibration may be performed by a user during a controlled process where the user actively executes certain actions or steps. In some embodiments, the calibration process may occur automatically where the 'x' value is obtained when a trailer is not connected, the vehicle is traveling at a given speed and a braking event occurs. The 'y' value may be similarly obtained when the trailer is connected, the vehicle is traveling at a given speed and a braking event occurs.

In some embodiments, the gain and boost may be automatically determined via a calibration process that utilizes a speed sensor to measure changes in rotation of a vehicle wheel or speed of the vehicle wheel during a single braking event rather than comparing a first braking event without a trailer connected to a second braking event when the trailer is connected.

For instance, a sensor (e.g., an accelerometer or the like) may be disposed proximal a vehicle axle or wheel, such as in a hub cub, a lug nut, or the like. The sensor may operatively measure rotation of the wheel. The calibration may occur during a braking event (e.g., when the user applies the brake peddle) or a non-braking event (e.g., at a time other than when the user applies the brake peddle) as described in more detail below.

It is noted that the calibration process may be initiated based on a triggering event. Triggering events may include, for example, receiving user input received via the user interface(s) 112 to instruct the brake controller 102 to begin a calibration (e.g., the user pushes a button), passage of time (e.g., periodically, hourly, daily, etc.), weather conditions (e.g., which may be received via a smart phone, vehicle control panel, GPS device, activation of windshield wipers, etc.), speed of the vehicle (e.g., speed within a range or at a certain value), changes in inclination of a roadway, starting or stopping the vehicle, location information, or the like.

During the calibration, the vehicle is in motion. The brake controller 102, via the processor 104, may generate output 122 to the trailer brakes. The processor 104 may generate a gradually increasing or ramping output that may initially start at a low value (e.g., low voltage, current, duty cycle, etc.). This may induce a relatively small amount of braking or no braking in the trailer brakes. The processor 104 may increase the brake output (e.g., such as in incremental steps in amplitude, voltage, or the like) and may monitor or measure the wheel speed received as input 120. In an aspect, the processor 104 may increase the braking output in steps (e.g., 1 volt, 1.5 volts, etc.). While increasing the brake output, the processor 104 may operatively communicate with a speed sensor, such as a wheel speed sensor described herein. If the wheel speed plateaus or comes to zero, this may indicate that the current brake output has induced the wheels to lockup.

The processor 104 may use the detected wheel lockup to automatically set the gain value. For instance, the processor 104 may set the gain based on the last known brake output that did not induce wheel lock up. In another aspect, the processor 104 may detect the brake lockup and decrease the brake output until the wheel is no longer locked. The processor 104 may determine that the wheel is no longer locked by analyzing input from the speed sensor. For example, if the speed sensor indicates a change in speed then the processor 104 may determine that the wheel is spinning and no longer locked. The decrease in brake output may follow a gradual stepped reduction in output. The processor 104 may then determine the gain based on the level of brake output where the wheels are no longer locked. In some embodiments, the processor 104 may utilize the gain value applied when the brakes are no longer locked.

In at least one example, the brake controller 102 may perform the calibration process during a braking event without requiring the user providing any input to initiate the calibration process. For example, if the user is traveling at a given speed, the brake controller 102 detects activation of the vehicle brakes (e.g., such as through a sensor coupled to the brake peddle or sensing activation of brake lights of the vehicle), and a triggering event occurs (as described herein), then the brake controller 102 may initiate the calibration process. The calibration process increases the brake output until lock-up is detected, then stops ramping the output and backs off the gain until the brake controller 102 detects that the lock-up condition is removed.

In another example, the brake controller 102 may perform the calibration process during a non-braking period at the request of a user or based on another triggering event. In an aspect, the user may be driving at a given speed with the trailer connected to the towing vehicle. During a non-braking period, the brake controller 102 initiates the calibration. The calibration process may be similar to what is described above where the processor 104 ramps the brake output and monitors for wheel lock-up. When the processor 104 detects the lock-up, the processor 104 may back off the current gain value until the wheels are no longer locked. The processor 104 may then select the gain value corresponding to the wheels becoming not locked as the gain value. It is noted that the user may feel a slight pull or tug as the processor 104 applies the brakes or as the wheel locks when the calibration process is executed during a non-braking event. When executing the calibration process during the braking event, the pull or tug may be less noticeable or not detected by a user.

The speed at which the vehicle is traveling may affect the calibration process. For instance, if the vehicle is traveling at too low or too high of speeds during calibration then the calibration may not be ideal. In another aspect, the calibration may be more noticeable at higher or lower speeds. As such, the brake controller 102 may initiate calibration at certain speeds and may not calibrate the gain or boost at other speeds. For example, the brake controller 102 may initiate calibration when a speed sensor(s) measures the speed of the vehicle at 35 mph, between 25-45 mph, or the like. It is noted that the speed or range of speeds may vary depending on the type of vehicle, weight of a trailer, weather conditions or other operating parameters.

Some embodiments may prevent a user from initiating calibration when speeds are not within a desired range. For instance, a user may provide input to instruct the brake controller 102 to initiate a calibration process. The processor 104 may determine the speed of the vehicle (such as via a speed sensor) and may determine whether or not to execute the calibration process based on the speed. If the speed is too high or too low, the processor 104 may instruct the interface(s) 112 to provide an error message to the user, notify the user, or the like. It is noted that the user may override the error message in some embodiments. Moreover, the processor 104 may provide error messages at other times. For instance, the processor 104 may provide an error message if the user attempts to initiate calibration without the trailer connected or otherwise attempts to initiate calibration outside of instructed operation.

While embodiments may refer to measuring rotation of the wheel, it is noted that the wheel is operatively connected to the axle. As such, reference to measuring rotation of a wheel includes measuring rotation of the axle and vice versa, unless context suggests otherwise or warrants a particular distinction for a given example.

In an aspect, the processor 102 may utilize processing techniques, such as artificial intelligence, statistical models, or other processes and/or algorithms. These high level-processing techniques can make suggestions, provide feedback, or provide other aspects. In embodiments, master controls may utilize classifiers that map an attribute vector to a confidence that the attribute belongs to a class. For instance, master controls may input attribute vector, $x=(x1, x2, x3, x4, xn)$ mapped to $f(x)=confidence(class)$. Such classification can employ a probabilistic and/or statistical based analysis (e.g., factoring into the analysis sensed information and braking attributes) to infer suggestions and/or desired actions. In various embodiments, processor 102 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as automotive systems.

In accordance with various aspects, some embodiments may employ classifiers that are explicitly trained (e.g., via a generic training data) as well as implicitly trained (e.g., via observing user behavior, user interaction with components, user preferences, historical information, receiving extrinsic information). For example, support vector machines may be configured via a learning or training phase within a classifier constructor and feature selection module. Thus, the classifier(s) may be used to automatically learn and perform a number of functions, including but not limited to determining, according to historical data, suggestions for gain and/or sensitivity settings. This learning may be on an individual basis, i.e., based solely on a single user, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user.

Examples of this may be found in U.S. patent application Ser. No. 15/261,312, which is hereby incorporated by reference.

It is further noted that the brake controller 102 may include manual overrides that allow a user to manually set the gain, transfer curve or boost. Moreover, embodiments may determine one of the gain, transfer curve or boost and not the others. It is noted that brake controller 102 may be configured to enable or disable automatically determining the gain, transfer curve or boost based on user preferences, based on a threshold speed or acceleration, or the like.

Figure 2:
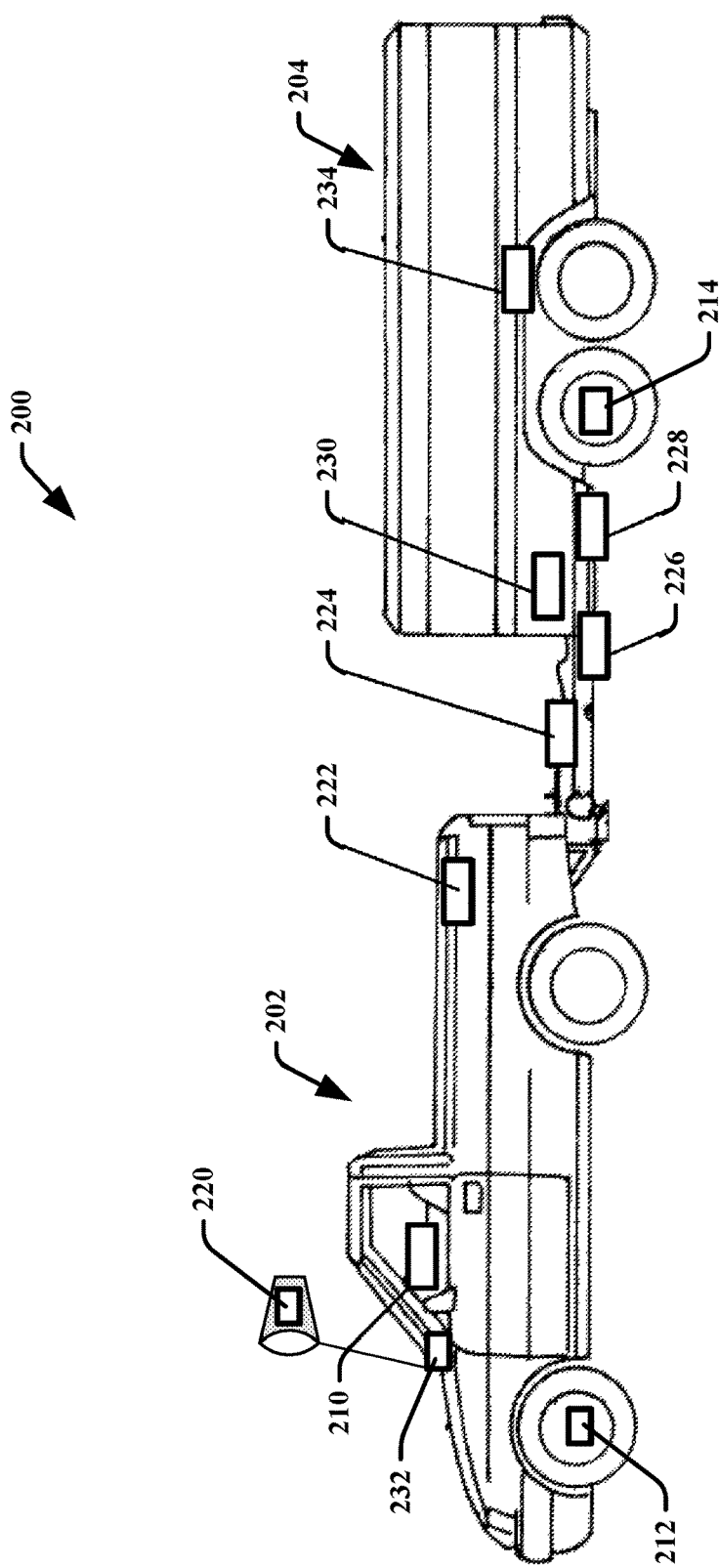
FIG. 2 is a schematic side view of an embodiment of a brake controller system with a towing and towed vehicle in accordance with the present disclosure.

Turning now to FIG. 2, there is an exemplary diagram of a brake controller system 200 for a towing vehicle 202 and a towed vehicle 204. A brake controller 210 may be mounted in the towing vehicle 202. The brake controller 210 may be operatively connected to brakes (not shown) of the towed vehicle 204. The brake controller 210 may operatively apply the brakes of the towed vehicle 204 according to a desired amount of stopping force. The brake controller system 200 may comprise all or some aspects described with reference to the brake controller system 100 of FIG. 1.

The brake controller system 200 may include one or more speed sensors 212 and 214. The speed sensors 212 or 214 may measure the speed of the towing vehicle 202 or towed vehicle. As described above, examples may refer to "speed" as either the towing or towed vehicle speed. Moreover, examples may describe aspects or processes associated with speed sensor 212 for brevity. Such processes may also be performed by speed sensor 214 unless noted otherwise.

The speed sensor 212 may comprise an accelerometer, gyroscope, or other electronic device. The speed sensor 212 may be mounted on a wheel, axle, a lug nut, or other portion of the towing or towed vehicle. For instance, an accelerometer may be mounted on a tire stem, concentric with a wheel, or the like. As the wheel rotates, the accelerometer may determine wheel speed. For instance, the accelerometer's first axis may be used to sense the rotation of the wheel. The first axis is the axis that is closest to being tangential to the circumference of the tire or perpendicular to it. Note that besides the rotation, the accelerometer is also affected by the deceleration of the vehicle. The accelerometer output changes in a sinusoidal fashion as the wheel rotates. Thus, the rotation of the wheel angle as a function of time can be measured. This $d\Theta/dT$ is measured as a function of the brake output (e.g., voltage, power, current, etc.) sent to or calculated for the trailer brakes and may represent the braking intent. The lower the $d\Theta/dT$ for a given brake voltage, the lower the effective $\mu$ of the road surface. In some systems, the lower the effective $\mu$ and more effective the brakes may be or the lighter the trailer may be. In other systems, the brakes may be less effective or the lighter the trailer may be. Accordingly, the brake controller 210 may automatically select a gain value that is lower and a less aggressive transfer function, including lower boost level for those instances where the brakes are more effective or the trailer may be lighter. In instances where the brakes are less effective or the trailer is heavier, the rake controller 210 may automatically select a gain value that is higher and a more aggressive transfer function. In other embodiments when the $d\Theta/dT$ is higher the higher the effective $\mu$ and the brake controller 210 may select an operative gain, boost or transfer function. For instance, the brake controller 210 will select a higher value of gain and more aggressive transfer function, including higher boost level or may select lower values based on other operating parameters.

It is noted that the speed may be communicated from the speed sensor 212 to the brake controller 210, such as via a BLUETOOTH® module, or other communication protocol. In another aspect, the deceleration may be communicated from the speed sensor 212 to the brake controller 210. In at least one embodiment, the brake controller 210 may not include an internal accelerometer and may rely on the speed sensor 212. In another example, the brake controller 210 may utilize an internal accelerometer in conjunction with the speed sensor 212.

According to an embodiment, the brake controller 210 may store speed, acceleration, gain, transfer function, and boost settings in a memory. The brake controller 210 may use this historical data to determine updated gain, transfer function, and boost settings. For instance, if speed falls below a threshold value for a given braking power, the wheels may be in a locked state. This may indicate that the current value of braking power represents a gain value. Thus, during regular braking events, 'gain' can be calculated and compared with old gain values. A lower gain compared with prior gain values can be utilized as a result of low μ road surface. However, in some embodiments the higher gain values may be utilized as a as a result of low μ road surface and other operating parameters.

It is noted that the brake controller 210 may receive input from various other sensors or data collection/communication devices, examples of such are described in U.S. patent application Ser. No. 15/261,312, and various other sensors are described herein. In an example, sensors may include an environmental sensor 220 that may measure wind speeds, directions, humidity, or the like. The environmental sensor 220 may communicate collected measurements to the brake controller 210 via a communications protocol as described herein. In at least one embodiment, the brake controller 210 may receive such information from a network connected device (e.g., Internet connected device, cellular service connected device, etc.), user input, or the like.

The fifth wheel hitch or gooseneck coupler and ball modules 222 may sense and collect various data parameters related to the function of a fifth wheel hitch or gooseneck coupler and ball and/or the conditions under which such operates. As an example, the module 222 may perform warranty or diagnostic type data collection as it relates to cycles, load, trip data, vibration profile, misuses occurred such as loading with jaws closed or highball attachment, age, and additional sensor information. A fifth wheel hitch and gooseneck coupler and ball module 222 may communicate data related to the function of a fifth wheel hitch or gooseneck coupler and ball and/or the conditions under which such operates. For instance, the module 222 may communicate data to identify goose pop up, connection of jaws, and second lock latch status. Further, the modules 222 may communicate diagnostic status such as hitch pin, load, and disconnect status. Additional sensed parameters may include usage, wear, safety chain engagement, if actuation is open or closed, proximity to cab/trailer and connection or disconnection.

It is noted that a pin box module (not shown) may sense and collect various data parameters related to the function of a pin box and/or the conditions under which such operates. By way of a non-limiting example, the pin box module may perform warranty or diagnostic type data collection as it relates to load, cycles, auto inflate or deflate occurrences, connection, disconnect, trip data, and vibration profile. The pin box module may communicate various data parameters related to the function of a pin box and/or the conditions under which such operates. By way of a non-limiting example, the pin box module may communicate data to identify connection status, articulation proximity, and air ride. Further, the module 110F may communicate diagnostic status such as air bag failure, disconnection, load, high pin, and pressure. Additional sensed parameters may include, without limitation, auto inflate/deflate, load, tire pressure monitoring system (TPMS), and proximity. As noted herein, such sensed parameters may include other or different parameters. Exemplary parameters are provided for purpose of illustration.

A coupler module 224 may sense and collect various data parameters related to the function of a coupler and/or the conditions under which such operates. By way of a non-limiting example, the module 224 may perform warranty or diagnostic type data collection as it relates to a coupler safety pin, whether the coupler is connected or disconnected, load, usage, vibration profile, and misuse or wear. The coupler module 224 may communicate various data parameters related to the function of a coupler and/or the conditions under which such operates. By way of a non-limiting example, the module 224 may communicate data to identify connection status or the status of a second lock or catch. Further, the module 224 may communicate diagnostic status such as load, and disconnect status. Additional sensed parameters may include usage, wear, proximity to cab/trailer, connection or disconnection, and safety pin.

A jack assembly module 230 may sense and collect various data parameters related to the function of a jack assembly and/or the conditions under which such operates. By way of a non-limiting example, the module 230 may perform warranty or diagnostic type data collection as it relates to load, cycles, position of the jack (extended or retracted), travel, pivot, and lubrication. The jack assembly module 230 may communicate various data parameters related to the function of a jack assembly and/or the conditions under which such operates. By way of a non-limiting example, the module 230 may communicate data to identify position, load, and effort. Further, the module 230 may communicate diagnostic status such as cycles. Additional sensed parameters may include failure, wear/cycle, lubrication, electrical drive position or level, warnings for load or overload conditions, assist in hookup, and proximity related to jack stow or work positions.

A sway controller module 226 may sense and collect various data parameters related to the function of a sway controller and/or the conditions under which such operates. By way of a non-limiting example, the module 226 may perform warranty or diagnostic type data collection as it relates to road profile data, wheel speed, number of occurrence of sway control, the magnitude of occurrence of sway control, trailer conditions, gain, load, pin weight, and number of times a warning message is provided to the user. The sway controller module 226 may communicate various data parameters related to the function of a sway controller and/or the conditions under which such operates. By way of a non-limiting example, the module 226 may communicate data to identify outputs. Further, the module 226 may communicate diagnostic status such as if and/or when a sway event is in progress or has occurred. Additional sensed parameters may include when and/or if a warning/safety sway condition exists and wheel speeds at the time of the condition.

A weight distribution module 228 may sense and collect various data parameters related to the function of a weight distribution assembly and/or the conditions under which such operates. By way of a non-limiting example, the module 228 may perform warranty or diagnostic type data collection as it relates to cycles, load, usage, pads, profile, number of bar disconnects, clips, and trip data such as turns.

The weight distribution module 228 may communicate various data parameters related to the function of a weight distribution assembly and/or the conditions under which such operates. By way of a non-limiting example, the module 228 may communicate data to identify a load, and a level. Further, the module 228 may communicate diagnostic status such as load, conditions, bar disconnect status, and friction pad wear. Additional sensed parameters may include usage, wear, load at head/base, level, proximity, missing clips, and special relationship to other assemblies such as motorized systems including jack assemblies.

A windshield wiper module 232 may sense, communicate, and collect various data parameters related to the function of a windshield wiper and/or the conditions under which such operates. By way of a non-limiting example, the module 232 may sense when windshield wipers are operating. If the wipers are operating over a set length of time (e.g., 10 seconds), the brake controller 210 may identify the possibility of wet weather.

It is noted that brake controller 210 may receive information from some, all or none of the described sensors or modules. Moreover, the brake controller 210 may communicate (wirelessly or via a wired connection) directly with the sensors or modules, and/or may communicate via a communications bus or hub.

Figure 3:
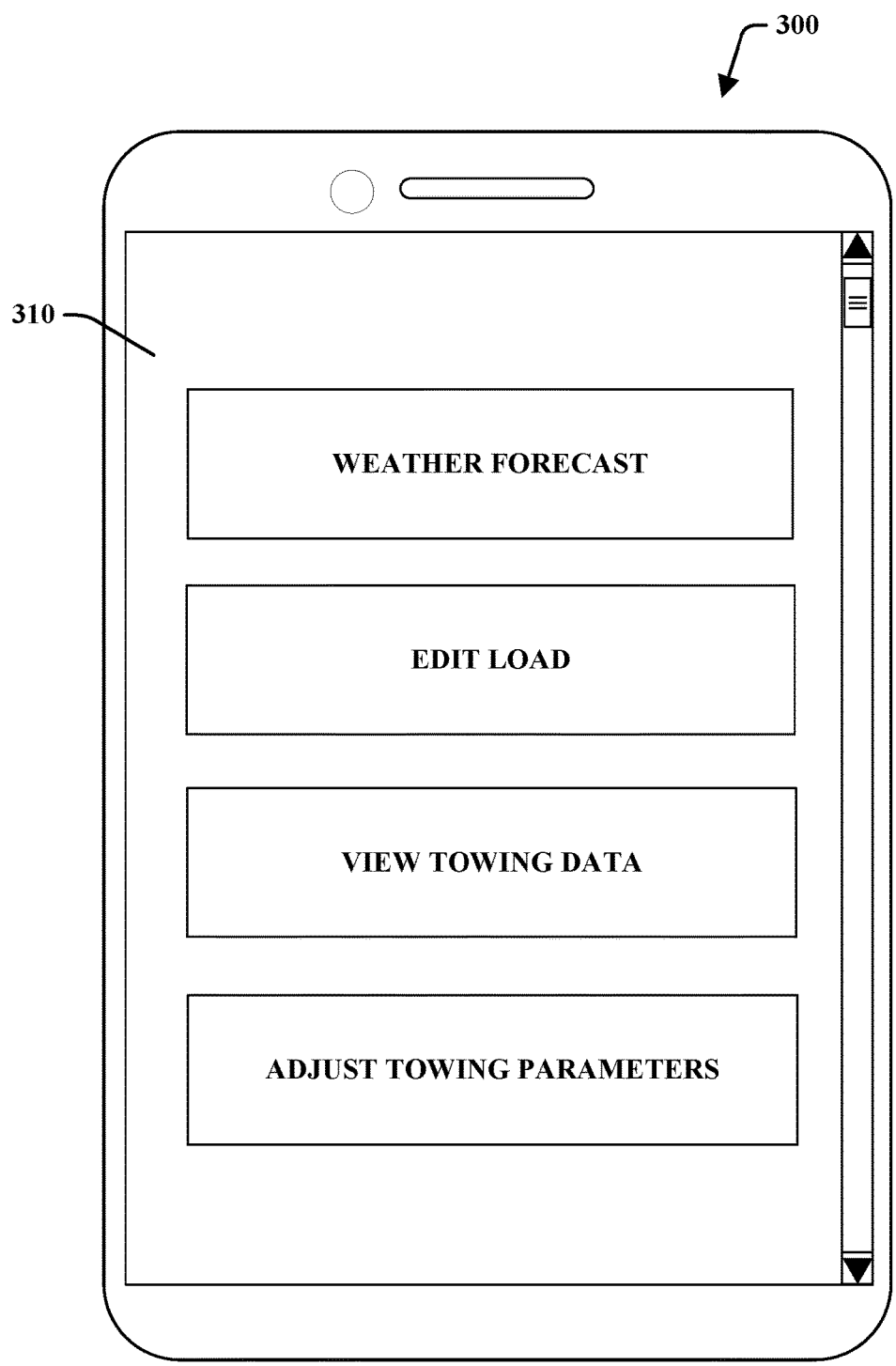
FIG. 3 is a user equipment device and interface that may be used with a brake controller system in accordance with the present disclosure.

Moreover, the brake controller 210 may receive information from an internet or network connected user equipment device, such as smartphone 300 shown in FIG. 3. The smartphone 300 may include GPS capability, access to communication networks, and the like. In an example, the brake controller 210 may communicate with the smartphone 300 via a wireless connection. The brake controller 210 may receive information from the smartphone 300, such as weather forecasts, information about a current load, information regarding adjustments to braking settings and various other parameters. It is noted that the smartphone 300 may receive user input and/or may automatically retrieve information. In another aspect, the brake controller 210 may transmit data to the smartphone 300, such as historical and/or current information about the brake controller system 200.

Figure 4:
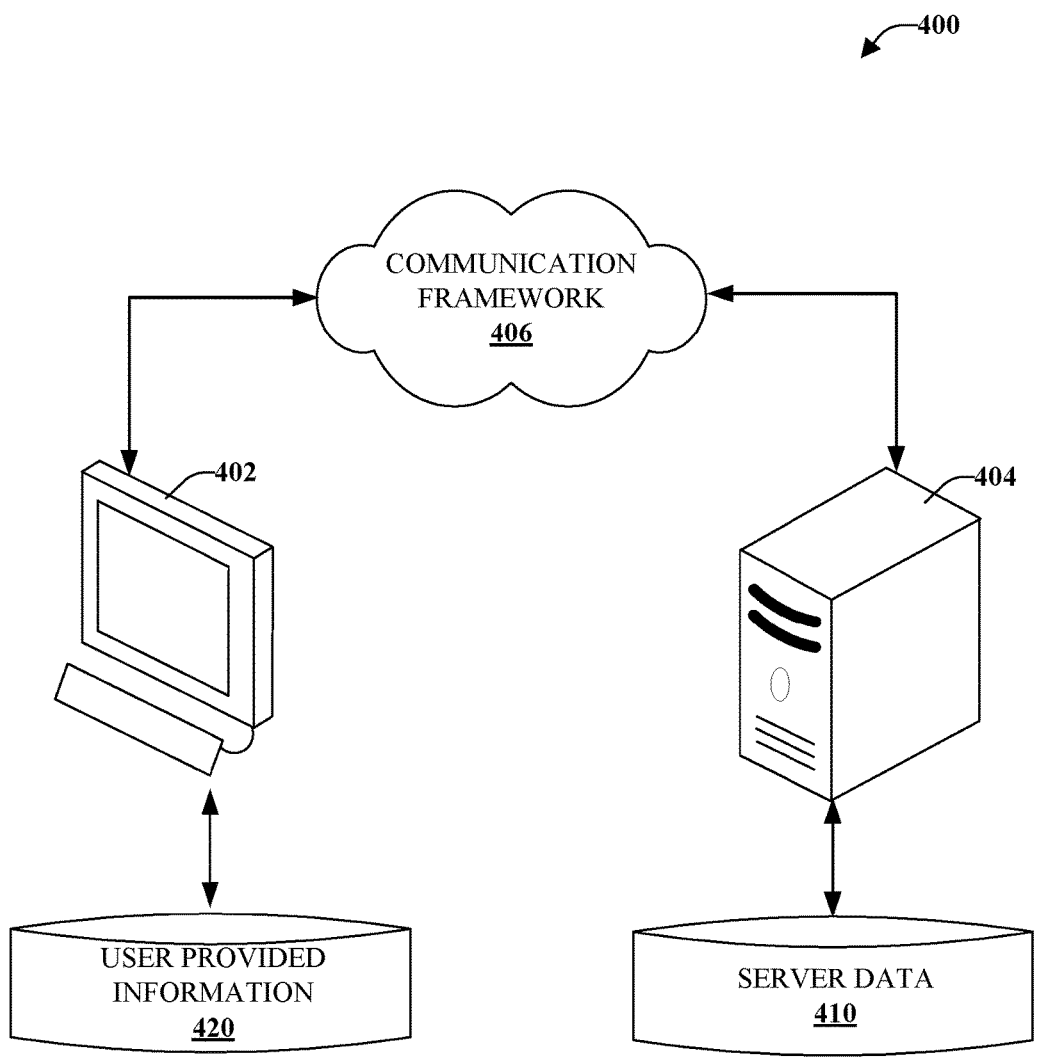
FIG. 4 is a schematic view of an embodiment of the data collection and communication system of the present disclosure.

FIG. 4 illustrates a network system architecture 400 that includes a communication framework 406 for collecting, processing, and communicating data. The communication framework 406 allows data to be sensed at a particular towing system of the towed and towing vehicles. An interface device 402 may be in communication with a computer/processor 404 by way of the communication framework 406 such as the internet, network, or cloud as is generally known in the art or as may be developed in the future. The processor 404 and communication framework 406 of the system architecture 400 may also include on on-line web server. The interface device 402 may be a computer, smartphone, tablet, brake controller, GPS device, laptop, or other device that is accessible by the user to access a website application. The towing system device modules 410 may be in communication with the computer/processor 104 by way of the communication framework 406.

The computer/processor 404 of the network system 400 may include a database that is configured to receive the sensed data from at least one towing system device module. Sensed data may be collected through the communication framework 406 and stored at the database maintained within the computer/processor 404. The collection of sensed data may then be processed to identify various data sets. The data sets may then be communicated to the interface device 402. The network system 400 may process information and provide instructions to perform actions. As such, the network system 400 may be an active system. It is noted that embodiments may comprise a passive or diagnostic system. Moreover, embodiments may include different modes (e.g., active and passive) that may be selectively engaged.

The data obtained from the system may permit the manufacturer to be more in touch with the end user. It may allow the manufacturer to provide users with recommendations as to the settings of the various towing accessory devices or uses of the towing accessory devices. For instance, a network system 400 may receive input from one or more users or user devices (e.g., smart phones communicatively coupled to a brake controller). The network system 400 may determine adjustments or best fit settings for a given user based on driving habits, load, a user's towed or towing vehicle, or the like. The best fit settings may be communicated to the user via an interface, such as a screen of a smart phone or display of a brake control unit. In another aspect, the best fit settings may be utilized to automatically adjust settings of a brake controller without requiring user action to approve the modifications or enter the adjustments. It is noted, however, that some embodiments may allow a user to opt-in or opt-out of automatic updates. Moreover, a user may be prompted to provide input to approve the automatic updates.

Figure 5:
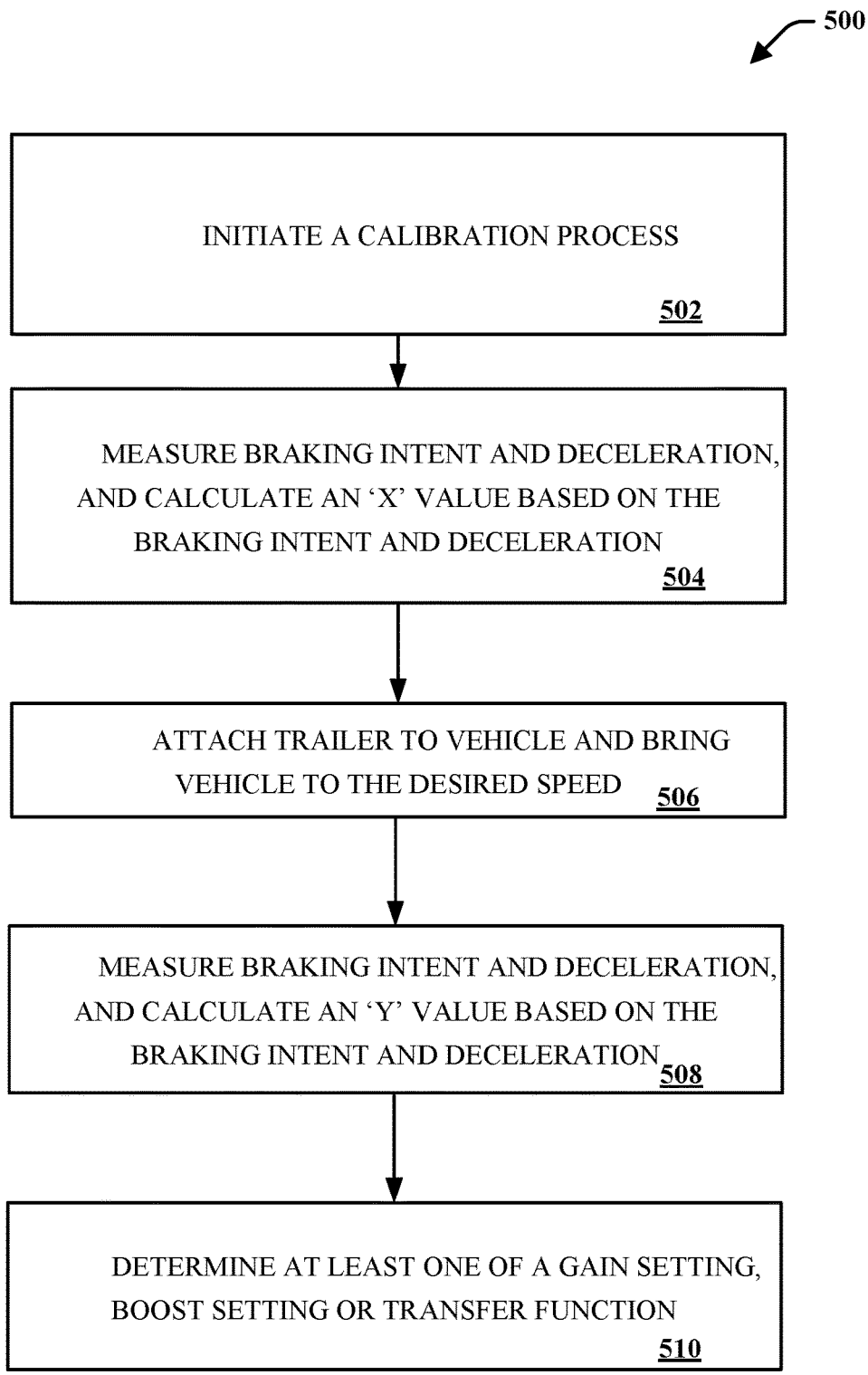
FIG. 5 is a method of automatically determining a gain setting, a boost setting, or a transfer function in accordance with the present disclosure.
Figure 6:
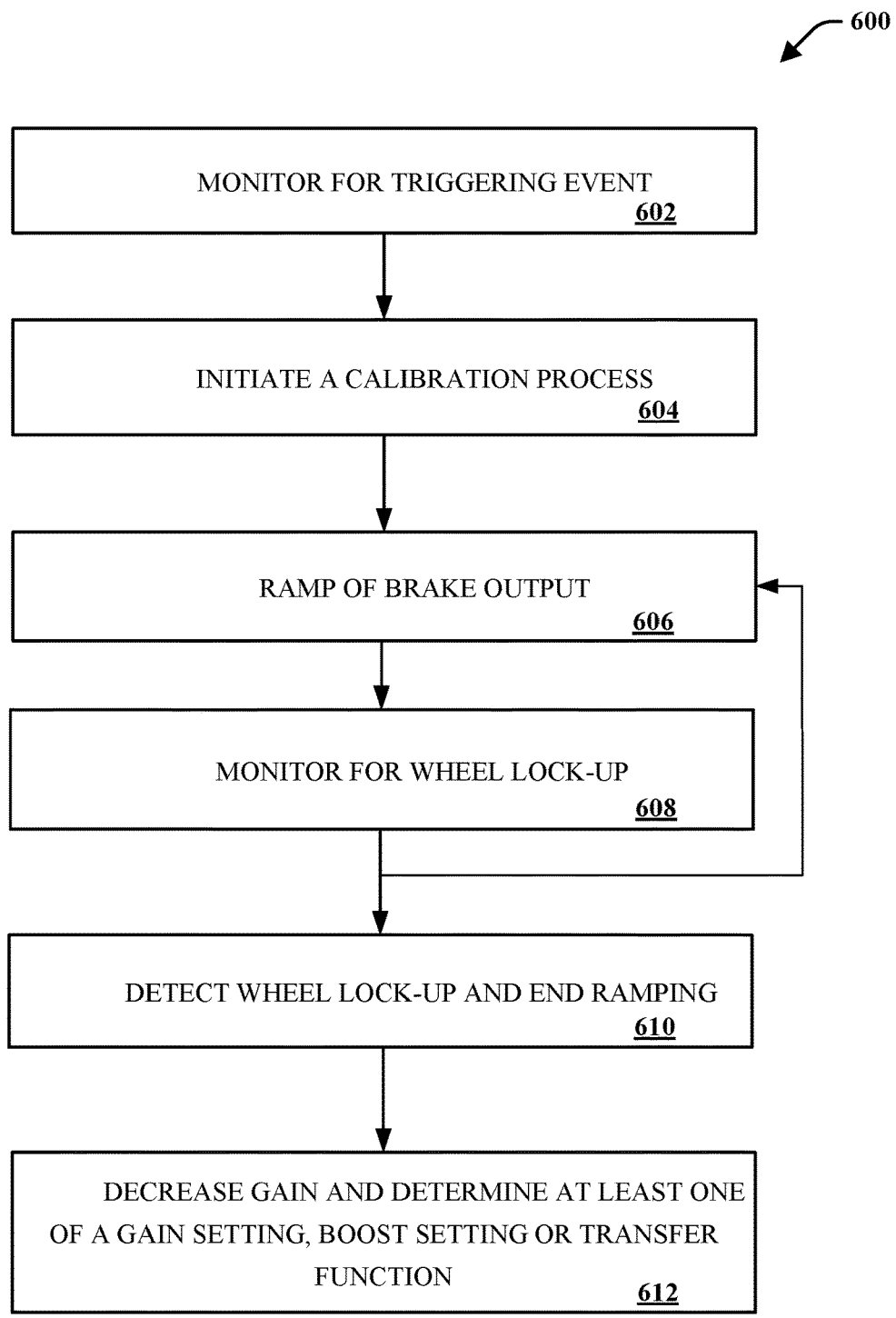
FIG. 6 is another method of automatically determining a gain setting, a boost setting, or a transfer function in accordance with the present disclosure.

In view of the subject matter described herein, methods that may be related to various embodiments may be better appreciated with reference to the flowcharts of FIGS. 5-6. While the methods are shown and described as a series of blocks, it is noted that associated methods or processes are not limited by the order of the blocks unless context suggests otherwise or warrants a particular order. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 5 is a flow chart of an exemplary method 500 of automatically determining a gain setting, boost setting, or transfer function for a boost as described herein. The method 500 may be utilized to calibrate the gain, boost, or transfer function upon a triggering event as described herein. The method 500 may calibrate the settings based on a comparison of a braking event where a towed trailer is connected and is not connected.

At 502, a brake controller (e.g., brake controller 102 via processor 104) may initiate a calibration process. The calibration may be initiated by a button press or another triggering event. In an aspect, the vehicle is not connected to a trailer at reference 502. Moreover, the vehicle is driven to a desired speed. It is noted that the brake controller may notify the user when the speed is reached.

At 504, the brake controller may measure braking intent and deceleration, and calculate an 'x' value based on the braking intent and deceleration. For instance, the user may press the brake peddle of the towing vehicle and intent may be measured via a sensor coupled to the brake peddle. The brake controller may utilize an accelerometer to measure deceleration. The brake controller may store the 'x' value in a memory as described herein.

At 506, the trailer may be attached to the towing vehicle and the vehicle may be brought to the desired speed (e.g., it is noted that the method may allow or account for some variance or margin of error). It is noted that this may completed by an end user or an installer.

At 508, the brake controller may measure braking intent and deceleration, and calculate a 'y' value based on the braking intent and deceleration. Similar to reference number 504, the intent and deceleration may be measured when the user applies the brakes.

At 510, the brake controller may determine (e.g., calculate) at least one of a gain setting, boost setting or transfer function. It is noted that the brake controller may determine the gain setting and then may calculate the boost as a function of the determine gain as well as the transfer function. Moreover, the brake controller may determine the settings based on comparison of the 'x' value and the 'y' value.

Turning now to FIG. 6, there is a method 600 that may automatically determine at least one of a gain setting, boost setting or transfer function based on detecting trailer wheel lock-up from input of a speed sensor, which may comprise an accelerometer mounted on a wheel, axle, a lug nut, or other portion of the towing or towed vehicle.

At 602, a brake controller (e.g., brake controller 102) may monitor for a triggering event as described herein. For instance, the brake controller may monitor for occurrence of one or more operating conditions, such as the trailer operatively connected to the brake controller and towing vehicle, the vehicle traveling at a speed or range of speeds, weather condition, button press, or the like. It is further noted that the triggering event may include determining whether or not a brake peddle has been depressed by a user as described herein.

At 604, the brake controller may initiate a calibration process in response to detection of the triggering event.

At 606, the brake controller may ramp a brake output. Ramping of the brake output may include increasing a voltage, amplitude, duty-cycle, or the like of output from the brake controller to the towing vehicle brakes. The ramping may include increasing the brake output in discrete steps at given time intervals.

At 608, the brake controller may monitor for wheel lock-up. For example, the brake controller may operatively communicate with a speed sensor through a wireless connection, such as BLUETOOTH, or the like. The speed sensor may output measurements of wheel rotation. If the output of the speed sensor does not indicate wheel lock-up (e.g., the output is not zero or generally zero), then the method may continue to ramp at 606. If the output of the speed sensor indicates that the wheels have locked, then the method may proceed to reference number 610.

At 610, the brake controller may detect the wheel lock-up and end the ramping of the output to the trailer brakes as described herein.

At 612, the brake controller may decrease the gain until the wheels are no longer locked. The brake controller then sets the gain value associated with the wheels becoming unlocked as the gain value for the brake controller. It is noted that the brake controller may determine a boost setting or a transfer function as a function of the gain value. In some embodiments, the brake controller may determine the boost setting or the transfer function as a function of the gain setting and operating parameters, such as whether conditions, road inclination, trailer load, or the like as described herein.

As used herein, the terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor. Moreover, such terms may be localized to one computer and/or may be distributed across multiple computers.

While methods may be shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

What is claimed is:

1. A system comprising:
    at least one sensor operatively determining a parameter associated with a braking event; and
    a brake controller comprising an accelerometer and a processor, the processor in operative communication with the at least one sensor and configured to receive data from the at least one sensor,
    wherein the processor determines at least one of a gain level or a boost level based on the data received from the at least one sensor; and
    wherein the processor initiates a calibration process to determine at least one of the gain level or the boost level based on an occurrence of a triggering event.

2. The system of claim 1, wherein the at least one sensor is operatively disposed proximal to at least one of an axle or a wheel of a vehicle or a trailer and operatively measures a change in the vehicle speed or the trailer speed.

3. The system of claim 2, wherein the at least one sensor comprises a speed sensor.

4. The system of claim 3, wherein the speed sensor is an accelerometer.

5. The system of claim 3, wherein the speed sensor is operatively coupled to a lug nut of the vehicle or the trailer.

6. The system of claim 1, wherein the triggering event comprises at least one of a passage of time, button press, weather condition, sensed speed, or rake peddle depression.

7. The system of claim 1, wherein the processor determines the weather condition based on at least one of activation or deactivation of windshield wipers, or input from a user device.

8. The system of claim 1, wherein the at least one sensor comprises a sensor disposed generally proximal to a brake peddle of a vehicle to measure forces applied to the brake peddle.

9. The system of claim 1, wherein the processor operatively overrides the determined gain level or boost level in response to receiving a user request to override the determined gain level or boost level.

10. A brake controller comprising:
    a hardware processor and a memory storing computer executable instructions;
    a wireless communication device coupled to the hardware processor and in operative communication with a speed sensor;
    wherein the processor conducts a calibration process to automatically determine at least one of a gain setting, boost setting, or transfer function as a function of information received from the speed sensor.

11. The brake controller of claim 10, wherein the hardware processor determines whether a brake peddle of a towed vehicle is not depressed and initiates the calibration process when the brake peddle is not depressed.

12. The brake controller of claim 10, wherein the hardware processor determines whether the brake peddle of a towed vehicle is not depressed and initiates the calibration process in response to determining that the brake peddle is depressed.

13. The brake controller of claim 10, wherein the hardware processor ramps an output from the hardware processor to brakes of a trailer in response to initiating the calibration process.

14. The brake controller of claim 13, wherein the hardware processor monitors for a wheel lock-up based on an input received from the speed sensor as the output is ramped.

15. The brake controller of claim 14, wherein the hardware processor terminates the ramping in response to detecting the wheel lock-up, reduces the output until the wheel lock-up terminates, and sets a gain value based on a value of the output at the time when the wheel lock-up terminates.

16. A method for automatically determining a gain setting for a brake controller, comprising:
monitoring, by the brake controller, for a triggering event and initiating a calibration of the gain setting in response to the triggering event;
ramping output of the brake controller to brakes of a trailer;
receiving input from a sensor operatively attached to at least one of a wheel or an axle of the trailer;
determining whether the wheels of the trailer are locked based on the input received from the sensor;
terminating, in response to determining that the wheels of the trailer are locked, the ramping of the output of the brake controller to the brakes of the trailer;
reducing the output of the brake controller to the brakes of the trailer to a value until the wheels are no longer locked; and
determining the gain setting based on the value.

17. The method of claim 16, further comprising:
determining whether a speed of the trailer is within a predetermined range of speeds;
allowing initiation of the calibration process when the speed is determined to be within the predetermined range; and
at least one of disabling or notifying a user that the speed is determined to be not within the predetermined range.

18. The method of claim 16, wherein determining the gain setting is further based on at least one of a weather condition, road grade, or trailer load.

19. The method of claim 16, further comprising generating a suggested modification of a setting of a brake controller based a history of calibrations.

20. A system comprising:
at least one sensor operatively determining a parameter associated with a braking event; and
a brake controller comprising an accelerometer and a processor, the processor in operative communication with the at least one sensor and configured to receive data from the at least one sensor,
wherein the processor determines at least one of a gain level or a boost level based on the data received from the at least one sensor; and
wherein the processor operatively overrides the determined gain level or boost level in response to receiving a user request to override the determined gain level or boost level.

* * * * *